(12) United States Patent
Metius et al.

(10) Patent No.: US 7,938,882 B2
(45) Date of Patent: May 10, 2011

(54) METHOD AND SYSTEM FOR THE SUPPLY OF HOT DIRECT REDUCED IRON FOR MULTIPLE USES

(75) Inventors: Gary Edward Metius, Charlotte, NC (US); Stephen Craig Montague, Midland, NC (US); Russell Kakaley, Charlotte, NC (US)

(73) Assignee: Midrex Technologies, Inc., Charlotte, NC (US)

( * ) Notice: Subject to any disclaimer, the term of this patent is extended or adjusted under 35 U.S.C. 154(b) by 318 days.

(21) Appl. No.: 12/057,910

(22) Filed: Mar. 28, 2008

(65) Prior Publication Data

US 2008/0236335 A1 Oct. 2, 2008

Related U.S. Application Data

(60) Provisional application No. 60/921,539, filed on Apr. 2, 2007.

(51) Int. Cl.
*C21B 13/02* (2006.01)
(52) U.S. Cl. .............................. 75/436; 75/491; 75/496
(58) Field of Classification Search .................... 75/436, 75/490
See application file for complete search history.

(56) References Cited

U.S. PATENT DOCUMENTS

| | | | |
|---|---|---|---|
| 5,296,015 A | 3/1994 | Becerra-Novoa et al. | |
| 5,730,775 A | 3/1998 | Meissner et al. | |
| 5,873,925 A | 2/1999 | Rinker et al. | |
| 6,162,050 A | 12/2000 | Bueno et al. | |
| 6,214,086 B1 | 4/2001 | Montague et al. | |
| 6,409,790 B1 | 6/2002 | Calderon et al. | |
| 6,602,317 B2 * | 8/2003 | Metius et al. | 75/380 |
| 2006/0162499 A1 * | 7/2006 | Lee et al. | 75/560 |
| 2009/0211401 A1 * | 8/2009 | Zendejas-Martinez et al. | 75/443 |

FOREIGN PATENT DOCUMENTS

| | | |
|---|---|---|
| GB | 1004428 | 9/1965 |
| WO | WO2006043770 A1 | 4/2006 |

* cited by examiner

*Primary Examiner* — George Wyszomierski
(74) *Attorney, Agent, or Firm* — Clements Bernard PLLC; Christopher L. Bernard; Lawrence A. Baratta, Jr.

(57) ABSTRACT

The present invention relates generally to a method and system for the supply of a continuous stream of hot direct reduced iron (HDRI) from a direct reduction (DR) shaft furnace or direct reduced iron (DRI) reheating furnace to a point outside of the DR shaft furnace or DRI reheating furnace where the HDRI stream is split into at least two HDRI streams. The first HDRI stream is sent continuously to a hot briquetting plant by gravity in a closed duct system. The second HDRI stream is sent continuously to an adjacent melting furnace also by gravity in a closed duct system, with a surge bin and feeders, or by a combination of gravity in a closed duct system, also with a surge bin and feeders, and a generally horizontal charge conveyor. Optionally, a third HDRI stream is employed to continuously feed multiple hot transport vessels.

14 Claims, 3 Drawing Sheets

METHOD AND SYSTEM FOR THE SUPPLY OF HOT DIRECT REDUCED IRON FOR MULTIPLE USES

CROSS-REFERENCE TO RELATED APPLICATION

The present non-provisional patent application claims the benefit of priority of U.S. Provisional Patent Application No. 60/921,539, filed on Apr. 2, 2007, and entitled "METHOD AND SYSTEM FOR THE SUPPLY OF HOT DIRECT REDUCED IRON FOR MULTIPLE USES," the contents of which are incorporated in full by reference herein.

FIELD OF THE INVENTION

The present invention relates generally to a method and system for the supply of a continuous stream of hot direct reduced iron (HDRI) from a direct reduction (DR) shaft furnace or direct reduced iron (DRI) reheating furnace to a point outside of the DR shaft furnace or DRI reheating furnace where the HDRI stream is split into at least two HDRI streams. The first HDRI stream is sent continuously to a hot briquetting plant by gravity in a closed duct system. The second HDRI stream is sent continuously to an adjacent melting furnace also by gravity in a closed duct system, with a surge bin and feeders, or by a combination of gravity in a closed duct system, also with a surge bin and feeders, and a generally horizontal charge conveyor. Optionally, a third HDRI stream is employed to continuously feed multiple hot transport vessels.

BACKGROUND OF THE INVENTION

Most conventional direct reduction (DR) plants in the world were designed and are operated to produce, cool, and discharge direct reduced iron (DRI) at temperatures of less than about 100 degrees C. These DR plants are typically located in or adjacent to a steelmaking complex and the DRI is used in a nearby electric arc furnace (EAF). Some DR plants, however, are not located in or adjacent to a steelmaking complex. These are primarily merchant DR plants, selling DRI in the worldwide market. The merchant DR plants prefer to sell DRI that has been compacted and densified, making handling, storage, and shipping easier and safer. The merchant DR plants typically briquette DRI while it is still hot (i.e. greater than about 600 degrees C.) in order to get a high apparent density of hot briquetted iron (HBI). HBI is typically made by reducing pellets and lumps in a DR shaft furnace or iron fines in a fluidized bed reactor and feeding the hot direct reduced iron (HDRI) directly and continuously to the hot briquetting plant. After briquetting, the HBI is cooled to less than about 100 degrees C. for shipping.

In addition to these conventional DR and HBI plants, there are plants that are either utilizing or would like to utilize HDRI from the DR plant in the adjacent steelmaking complex, instead of feeding cold DRI to the melting furnace. In addition to feeding HDRI to the melting furnace, these plants would like to hot briquette any excess HDRI from the DR plant. This HBI may be stockpiled and utilized at a later date in the steelmaking complex, or may be sold as HBI to third parties.

Two early Purofer DR plants (currently inoperable) produced HBI by discharging HDRI from a DR shaft furnace into containers, and then moved the containers to a hot briquetting plant for HBI production. One of these Purofer DR plants also used the containers to charge the HDRI to a steelmaking furnace. Likewise, a plant in India is currently producing and feeding HDRI from a DR shaft furnace to both a hot briquetting plant and insulated containers that are transported to an adjacent melting furnace for steel production.

The concept of producing HDRI in a solid coal-based DR plant and discharging it to a variety of downstream uses or systems, such as a hot briquetting plant, insulated containers, a melter, or a cooler is well known to those of ordinary skill in the art. For example, U.S. Pat. No. 5,873,925, Rinker et al., discloses the discharge of HDRI from a coal-based rotary hearth furnace to an insulated container, a hot compaction unit, or a cooler. U.S. Pat. No. 5,570,775, Meissner et al., discloses the discharge of HDRI from a coal-based rotary hearth furnace to a hot briquetting plant or hot transfer bin, insulated containers, a melter, or a cooler. GB 1,004,428, Metalgesellschaft, discloses the discharge of HDRI made from greenballs in a coal-based rotary hearth furnace (i.e. a kiln) for hot briquetting or melting. U.S. Pat. No. 6,409,790, Calderon et al., discloses the production of DRI with solid carbon and hot transfer to an oxy-melter, and the discharge of HDRI to a hot briquetting plant or insulated containers. All of these references, however, are coal-based and disclose the discharge of HDRI to one use at a time. None of the references disclose the discharge of HDRI to simultaneous multiple uses.

The concept of producing HDRI in a gas-based shaft furnace-type DR plant is also well known to those of ordinary skill in the art. For example, U.S. Pat. No. 6,162,050, Bueno et al., discloses the simultaneous discharge of HDRI to a hot briquetting plant, a melter, and a cooler. Each discharge rate is independently controlled. U.S. Pat. No. 5,296,015, Novoa et al., discloses the pneumatic transfer of hot or cold DRI from the discharge of a reduction reactor (i.e. a DR shaft furnace) to one or more points of processing, such as a hot briquetting plant, a storage bin, and/or a melter. U.S. Pat. No. 6,214,086, Montague et al., discloses the simultaneous supply of hot or cold DRI by gravity from a DR shaft furnace. The HDRI is discharged for briquetting, transporting, and/or melting. In all of these references, however, the HDRI is in the form of a pellet, lump, or agglomerate.

Thus, what is still needed in the art is a method and system for the supply of a continuous stream of HDRI from a DR shaft furnace or DRI reheating furnace to a point outside of the DR shaft furnace or DRI reheating furnace where the HDRI stream is split into at least two HDRI streams. Preferably, the first HDRI stream is sent continuously to a hot briquetting plant by gravity in a closed duct system. Preferably, the second HDRI stream is sent continuously to a melting furnace also by gravity in a closed duct system, with a surge bin and feeders, or by a combination of gravity in a closed duct system, also with a surge bin and feeders, and a generally horizontal conveyor. Optionally, a third HDRI stream is employed to continuously feed multiple hot transport vessels.

BRIEF SUMMARY OF THE INVENTION

In various exemplary embodiments, the present invention provides a method and system for the supply of a continuous stream of hot direct reduced iron (HDRI) from a direct reduction (DR) shaft furnace or direct reduced iron (DRI) reheating furnace to a point outside of the DR shaft furnace or DRI reheating furnace where the HDRI stream is split into at least two HDRI streams. The first HDRI stream is sent continuously to a hot briquetting plant by gravity in a closed duct system. The second HDRI stream is sent continuously to an adjacent melting furnace also by gravity in a closed duct system, with a surge bin and feeders, or by a combination of gravity in a closed duct system, also with a surge bin and feeders, and a generally horizontal conveyor. Optionally, a third HDRI stream is employed to continuously feed multiple hot transport vessels.

Advantageously, the method and system of the present invention supply HDRI for multiple uses at the highest possible temperature by minimizing heat losses, allowing the HDRI to flow in a continuous and controlled manner by gravity in the closed, insulated duct system. The method and system of the present invention independently control the discharge rates of the multiple streams of HDRI by effecting the split and independent control of the discharge rates of the multiple streams of HDRI outside of the DR shaft furnace or DRI reheating furnace at or near atmospheric pressure. Thus, multiple outlets that would affect the operation of the DR shaft furnace or DRI reheating furnace are not required. The method and system of the present invention eliminate the breakage of the associated hot pellets, lumps, or agglomerates, as well as the related dust generation that occurs with pneumatic transport systems. Finally, the method and system of the present invention, in the exemplary embodiment incorporating the combination of gravity and a generally horizontal charge conveyor, reduce the overall height of the DR shaft furnace or DRI reheating furnace.

In one exemplary embodiment, the present invention provides a method for the supply of a continuous stream of hot direct reduced iron from a direct reduction shaft furnace or direct reduced iron reheating furnace to a point outside of the direct reduction shaft furnace or direct reduced iron reheating furnace wherein the hot direct reduced iron stream is split into at least two hot direct reduced iron streams, the method including: providing a first hot direct reduced iron stream that is sent continuously to a hot briquetting plant by gravity in a first closed duct system; and providing a second hot direct reduced iron stream that is sent continuously to an adjacent melting furnace one of by gravity in a second closed duct system and by a combination of gravity in the second closed duct system and a generally horizontal charge conveyor. The method also includes providing one of a direct reduction shaft furnace and a direct reduced iron reheating furnace to provide hot direct reduced iron. Preferably, the direct reduction shaft furnace or direct reduced iron reheating furnace includes a converging discharge section. Preferably, the direct reduction shaft furnace or direct reduced iron reheating furnace includes a single outlet for the hot direct reduced iron, as opposed to multiple outlets for the hot direct reduced iron. The method further includes providing a product discharge chamber to receive the hot direct reduced iron. Preferably, the product discharge chamber includes a converging section. The method still further includes providing a stationary splitter to split the hot direct reduced iron into the first hot reduced iron stream and the second hot reduced iron stream. Preferably, the hot briquetting plant includes one or more hot briquetting machines each including a feeder. Optionally, the method still further includes sending at least a portion of the first hot direct reduced iron stream to a bypass discharge leg. Preferably, the melting furnace includes, prior to the melting furnace, one or more of a first feeder, a surge bin, and a second feeder. Optionally, the method still further includes providing a third hot direct reduced iron stream that is sent continuously to one or more hot transport vessels.

In another exemplary embodiment, the present invention provides a system for the supply of a continuous stream of hot direct reduced iron from a direct reduction shaft furnace or direct reduced iron reheating furnace to a point outside of the direct reduction shaft furnace or direct reduced iron reheating furnace wherein the hot direct reduced iron stream is split into at least two hot direct reduced iron streams, the system including: means for providing a first hot direct reduced iron stream that is sent continuously to a hot briquetting plant by gravity in a first closed duct system; and means for providing a second hot direct reduced iron stream that is sent continuously to an adjacent melting furnace one of by gravity in a second closed duct system and by a combination of gravity in the second closed duct system and a generally horizontal charge conveyor. The system also includes one of a direct reduction shaft furnace and a direct reduced iron reheating furnace to provide hot direct reduced iron. Preferably, the direct reduction shaft furnace or direct reduced iron reheating furnace includes a converging discharge section. Preferably, the direct reduction shaft furnace or direct reduced iron reheating furnace includes a single outlet for the hot direct reduced iron, as opposed to multiple outlets for the hot direct reduced iron. The system further includes a product discharge chamber to receive the hot direct reduced iron. Preferably, the product discharge chamber includes a converging section. The system still further includes a stationary splitter to split the hot direct reduced iron into the first hot reduced iron stream and the second hot reduced iron stream. Preferably, the hot briquetting plant includes one or more hot briquetting machines each including a feeder. Optionally, the system still further includes means for sending at least a portion of the first hot direct reduced iron stream to a bypass discharge leg. Preferably, the melting furnace includes, prior to the melting furnace, one or more of a first feeder, a surge bin, and a second feeder. Optionally, the system still further includes means for providing a third hot direct reduced iron stream that is sent continuously to one or more hot transport vessels.

In a further exemplary embodiment, the present invention provides a method for the supply of a continuous stream of hot direct reduced iron from a direct reduction shaft furnace or direct reduced iron reheating furnace to a point outside of the direct reduction shaft furnace or direct reduced iron reheating furnace wherein the hot direct reduced iron stream is split into at least two hot direct reduced iron streams, the method including: providing a first hot direct reduced iron stream that is sent continuously to a hot briquetting plant by gravity in a first closed duct system; providing a second hot direct reduced iron stream that is sent continuously to an adjacent melting furnace one of by gravity in a second closed duct system and by a combination of gravity in the second closed duct system and a generally horizontal charge conveyor; and providing a third hot direct reduced iron stream that is sent continuously to one or more hot transport vessels.

Thus, the advantages of the method and system of the present invention over conventional systems and methods include: a continuous feed to a melter charge system simplifies melt shop HDRI logistics and operations, as transport vessels, bins, and cranes are not required; a continuous feed to the melter charge system involves less heat loss than the use of transport vessels, as the transport vessels continue to lose heat when emptied, etc.; DR shaft furnace or DRI reheating furnace operation is not affected by a single discharge point, as would be the case with multiple discharge points; the split and control of streams of HDRI is easier and safer to perform while at or near atmospheric pressure than at or near DR shaft furnace or DRI reheating furnace operating pressures, as would be the case with multiple discharge points; and the gravity discharge and split of HDRI is not as complicated as the pneumatic transport of HDRI—gravity always works and pneumatic transport systems incorporate mechanical components that require regular maintenance and inherently have a lower availability.

BRIEF DESCRIPTION OF THE DRAWINGS

The present invention is illustrated and described herein with reference to the various drawings, in which like reference numbers are used to denote like method steps/system components, as appropriate, and in which.

DETAILED DESCRIPTION OF THE INVENTION

Figure 1:
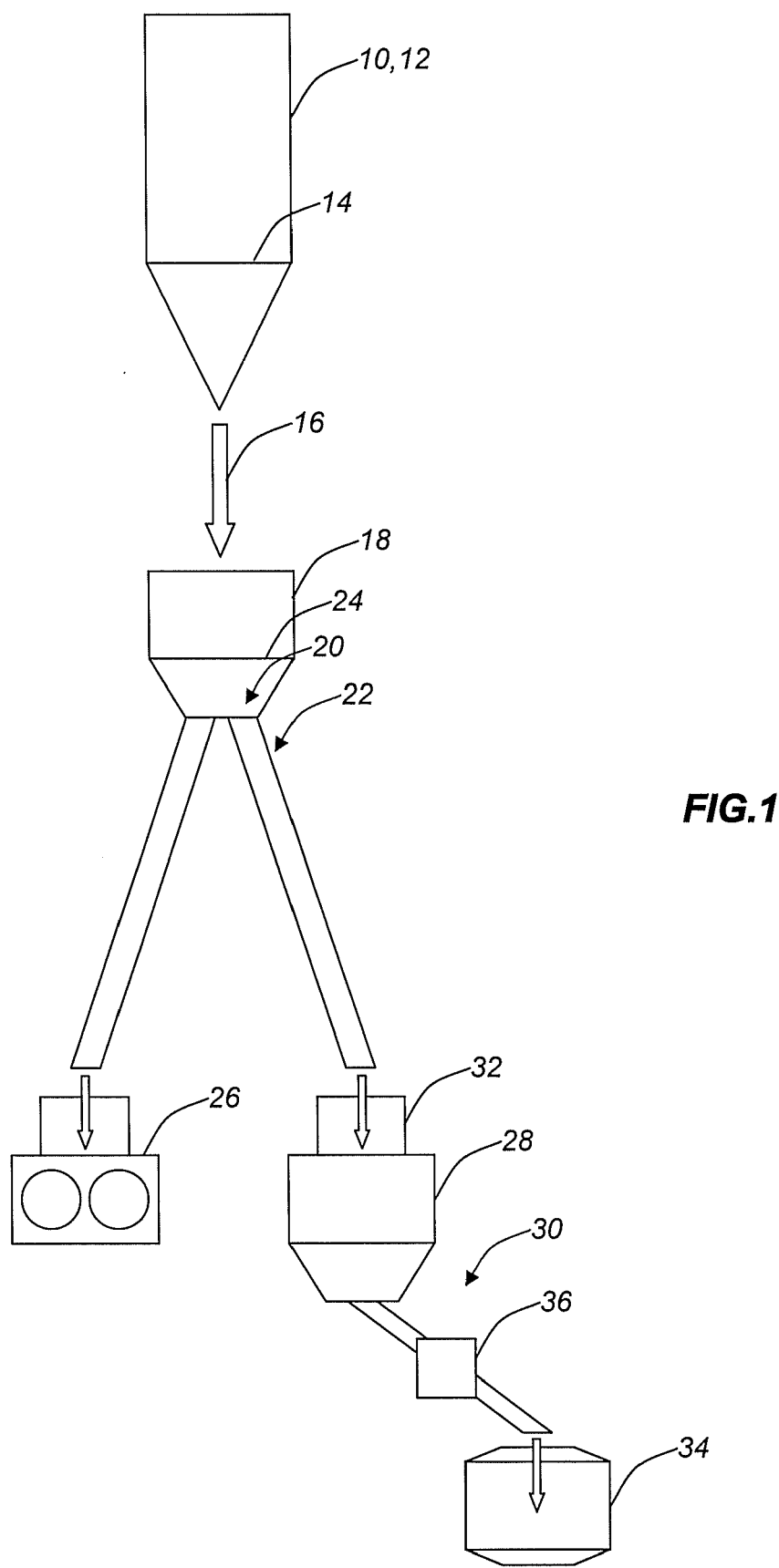
FIG. 1 is a schematic diagram illustrating, in one exemplary embodiment of the present invention, a method and system for the supply of a continuous stream of HDRI from a DR shaft furnace or DRI reheating furnace to a point outside of the DR shaft furnace or DRI reheating furnace where the HDRI stream is split into at least two HDRI streams, with the first HDRI stream sent continuously to a hot briquetting plant by gravity in a closed duct system and the second HDRI stream sent continuously to an adjacent melting furnace also by gravity in a closed duct system, with a surge bin and feeders.
Figure 2:
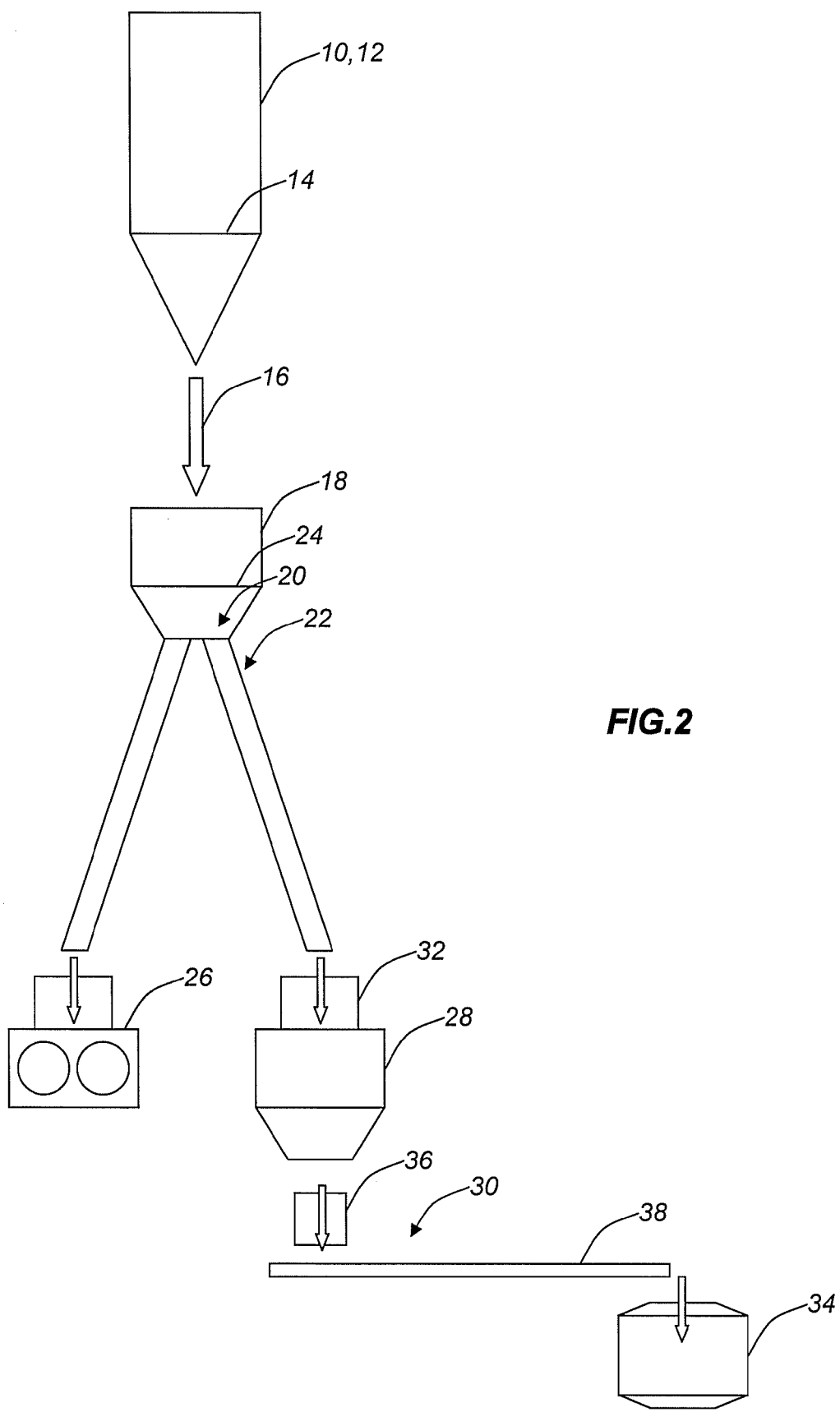
FIG. 2 is a schematic diagram illustrating, in another exemplary embodiment of the present invention, a method and system for the supply of a continuous stream of HDRI from a DR shaft furnace or DRI reheating furnace to a point outside of the DR shaft furnace or DRI reheating furnace where the HDRI stream is split into at least two HDRI streams, with the first HDRI stream sent continuously to a hot briquetting plant by gravity in a closed duct system and the second HDRI stream sent continuously to an adjacent melting furnace by a combination of gravity in a closed duct system, also with a surge bin and feeders, and a generally horizontal charge conveyor.
Figure 3:
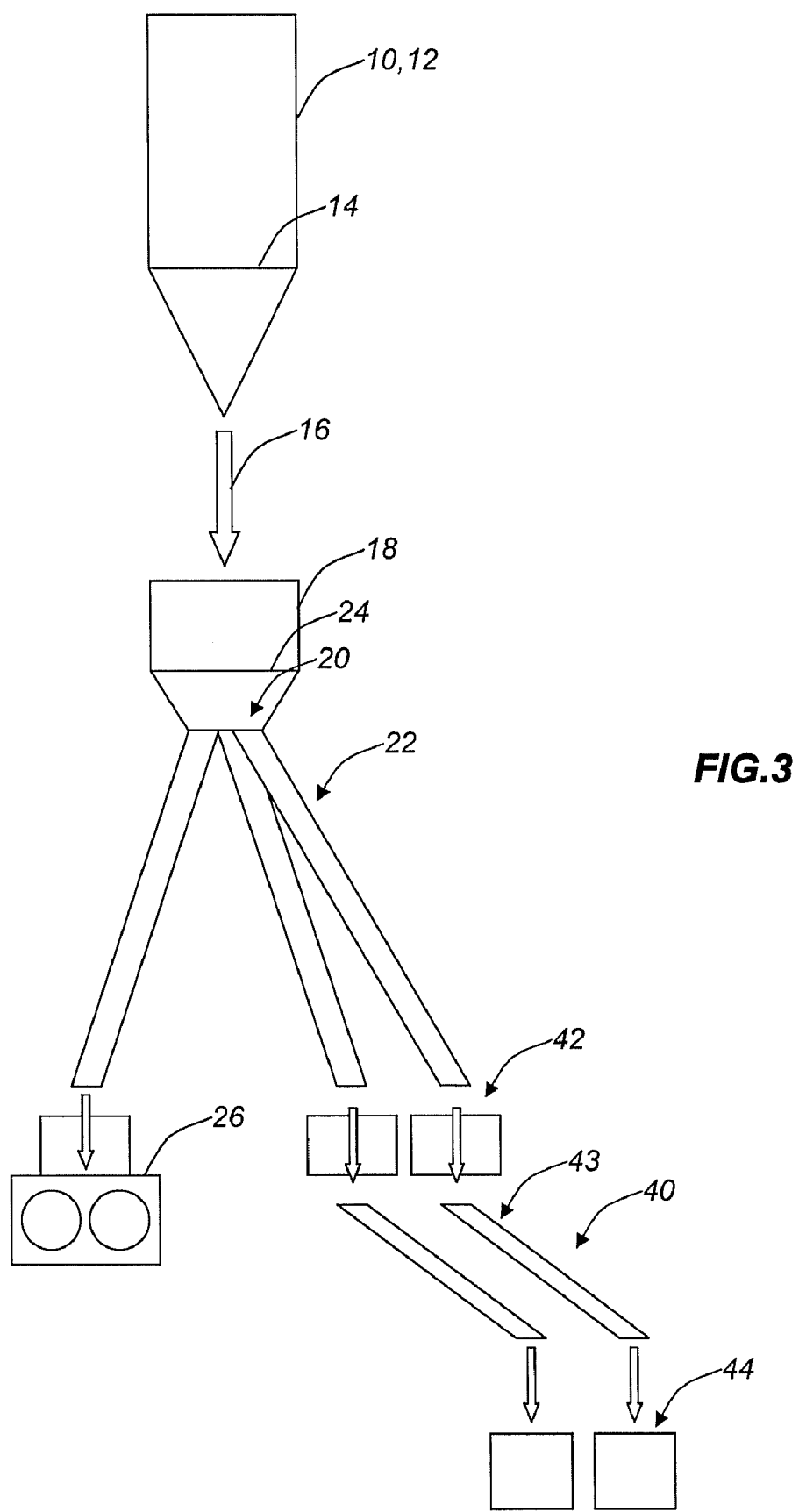
FIG. 3 is a schematic diagram illustrating, in a further exemplary embodiment of the present invention, a method and system for the supply of a continuous stream of HDRI from a DR shaft furnace or DRI reheating furnace to a point outside of the DR shaft furnace or DRI reheating furnace where the HDRI stream is split into at least two HDRI streams, with the first HDRI stream sent continuously to a hot briquetting plant by gravity in a closed duct system, the second HDRI stream sent continuously to a melting furnace also by gravity in a closed duct system, with a surge bin and feeders, or by a combination of gravity in a closed duct system, also with a surge bin and feeders, and a generally horizontal charge conveyor, and a third HDRI stream employed to continuously feed multiple hot transport vessels.

Referring now to FIGS. 1-3, hot direct reduced iron (HDRI) is produced by reducing iron oxide pellets, lumps, and/or agglomerates in a direct reduction (DR) shaft furnace 10. HDRI is also produced by reheating cold direct reduced iron (DRI) pellets, lumps, and/or agglomerates in a DRI reheating furnace 12.

In the case of the DR shaft furnace 10, the DR shaft furnace 10 is used to reduce the iron oxide with a countercurrent flow of reducing gas, consisting primarily of carbon monoxide and hydrogen. This reducing gas may be made from natural gas or other gaseous fuels, solid fuels, such as coal, or liquid fuels, such as heavy fuel oil. The HDRI descends as a moving packed bed through the DR shaft furnace 10 by gravity. The DR shaft furnace 10 has a converging discharge section 14 that ends as a point outlet through which all of the HDRI is continuously discharged.

In the case of the DRI reheating furnace 12, the design fundamentals described above are essentially the same even though the size of the heating zone may be smaller than the size of the reduction zone for the same discharge rate of HDRI. Screened DRI in the form of pellets, lumps, and/or agglomerates is charged to the top of the DRI reheating furnace 12 and flows through the DRI reheating furnace 12 as a moving packed bed by gravity. The DRI is heated by a countercurrent flow of recirculated gas that is non-oxidizing to both iron and carbon. This gas is produced by removing the outlet gas from the DRI reheating furnace 12, cooling, scrubbing, and compressing, and then heating in an indirect heater to the desired reheat temperature. A small amount of natural gas or methane may be added to be reformed by any oxidants coming into the DRI reheating furnace 12 from the sealing gas injected at the top and bottom dynamic seals.

The HDRI from the DR shaft furnace 10 or DRI reheating furnace 12 flows out of the DR shaft furnace 10 or DRI reheating furnace 12 through an insulated duct 16 to a product discharge chamber (PDC) 18 that includes a discharge feeder to control the discharge rate. The insulated duct 16 disposed between the DR shaft furnace 10 or DRI reheating furnace 12 and the PDC 18 acts as a dynamic seal leg that reduces the pressure at the converging section 14 from up to 3 barg to at or about atmospheric pressure at the PDC 18. This pressure reduction is accomplished by using a sealing gas that flows upwards and downwards at the point of injection. The upwards flow of sealing gas keeps the furnace or reducing gas from flowing out of the furnace, while the downwards flow of sealing gas causes a pressure drop through the HDRI, which results in the near atmospheric pressure at the PDC 18. This sealing gas may be nitrogen or a dry flue gas containing a minimized amount of oxidants.

The PDC 18 contains rotating screen sizers through which all of the HDRI must pass coming off of the PDC discharge feeder. These rotating screen sizers remove any hard clusters or tramp material that would cause problems in the downstream processing units, such as the hot briquetting machines or melter charging equipment. The removal of tramp material is especially important for protecting the hot briquetting machines, which operate at high hydraulic pressures and close tolerances. The bottom sealing gas from the dynamic sealing system is vented form the PDC 18 to a dust collection system. The lower section of the PDC 18 acts as a storage or surge bin to ensure that the HDRI is always available to the stationary splitter 20 that allows the HDRI to flow to the hot briquetting machines and melter charging equipment. The flow of HDRI from the PDC 18 ensures that the insulated ducts 22 from the PDC 18 are always full of HDRI and do not run partially or fully empty. Preferably, the lower section of the PDC 18 includes a converging section 24 including a flow stimulator, ensuring a uniform flow through the PDC 18.

The HDRI withdrawal rate from the PDC 18 through the stationary splitter 20 is set by the sum of the rates going to the hot briquetting machine and the melter surge bin. Each of these systems has one or more feeders to control the rate of HDRI going to each use point. The level of HDRI in the converging section 24 of the PDC 18 is maintained between high and low levels by varying the PDC discharge feeder.

Referring now to FIG. 1, the stream of HDRI feeding the hot briquetting plant may be split by the stationary splitter 20 into multiple HDRI streams, depending upon the number of hot briquetting machines in the hot briquetting plant 26. Each hot briquetting machine has its own feeder that controls the HDRI feed from the insulated duct 22 to the hot briquetting machine. The stationary splitter 20 may also have a discharge leg for bypassing HDRI, in addition to the discharge legs feeding the hot briquetting machines. This bypass discharge leg is typically used on startup or during upset conditions. Preferably, the stream of hot briquettes travels through a briquette separation system, where it is broken into essentially separate hot briquettes, with a few double and triple hot briquettes. The hot briquettes are then cooled on a cooling conveyor, screened, and sent to stockpile.

The HDRI flowing to the HDRI surge bin 28 in the adjacent HDRI charge system 30 is controlled by a screw feeder 32 or other similar device. The screw feeder 32 sets and controls the average rate of HDRI that is continuously fed to the HDRI surge bin 28. The HDRI surge bin 28 is large enough that the HDRI discharged from the HDRI surge bin 28 batches to the melting furnace 34 and does not draw the HDRI down below a predetermined level in the HDRI surge bin 28. The HDRI discharged from the HDRI surge bin 28 is controlled by a rotary feeder 36 or other similar device that responds to demand from the melting furnace 34. The HDRI from the HDRI surge bin 28 is fed directly to the melting furnace 34 by gravity.

Referring now to FIG. 2, the HDRI from the HDRI surge bin 28 is fed to the melting furnace 34 by a combination of gravity and a generally horizontal charge conveyor 38. This combination is sometimes advantageous over gravity alone, as the overall height of the DR shaft furnace 10 or DRI reheating furnace 12 is significantly reduced, the need for a separate melt shop structure to hold the HDRI surge bins is eliminated, and the interface bringing the HDRI to the melt shop is simplified.

Referring now to FIG. 3, a third stream of HDRI from the stationary splitter 20 at the PDC 18 may be provided to feed multiple hot transport vessels 44. The HDRI flows by gravity to a hot transport vessel distribution system 40 that includes one or more HDRI feeders 42 and one or more insulated ducts 43, each with a slide gate or the like for stopping the flow of HDRI to the hot transport vessel 44 associated with each insulated duct 43. HDRI surge bins are not required in this application as the hot transport vessels 44 themselves essentially become the HDRI surge bins. The hot transport vessels 44 may have one or more openings (i.e. top and bottom openings) for the charging and discharging of HDRI to and from the hot transport vessels 44. This third exemplary embodiment may be useful for charging a melting furnace in the event that the gravity or gravity/generally horizontal charge conveyor system is down for maintenance or has a problem. The hot transport vessels 44 may also be used to provide HDRI to other furnaces in a steelmaking complex, as appropriate.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A method for the supply of a continuous stream of hot direct reduced iron from a direct reduction shaft furnace or direct reduced iron reheating furnace to a point outside of the direct reduction shaft furnace or direct reduced iron reheating furnace, the method comprising:
   depressurizing a hot direct reduced iron stream in an insulated duct;
   after the depressurizing step, splitting the depressurized hot direct reduced iron stream into at least two depressurized hot direct reduced iron streams;
   after the splitting step, providing a first depressurized hot direct reduced iron stream that is sent continuously to a hot briquetting plant by gravity in a first closed duct system; and
   after the splitting step, providing a second depressurized hot direct reduced iron stream that is sent continuously to an adjacent melting furnace one of:
      by gravity in a second closed duct system, and
      by a combination of gravity in the second closed duct system and a generally horizontal charge conveyor.

2. The method of claim 1, further comprising providing one of a direct reduction shaft furnace and a direct reduced iron reheating furnace to provide hot direct reduced iron.

3. The method of claim 2, wherein the direct reduction shaft furnace or direct reduced iron reheating furnace comprises a converging discharge section.

4. The method of claim 2, wherein the direct reduction shaft furnace or direct reduced iron reheating furnace comprises a single outlet for the hot direct reduced iron, as opposed to multiple outlets for the hot direct reduced iron.

5. The method of claim 2, further comprising providing a product discharge chamber to receive the hot direct reduced iron.

6. The method of claim 5, wherein the product discharge chamber comprises a converging section.

7. The method of claim 2, further comprising providing a stationary splitter to split the hot direct reduced iron into the first hot reduced iron stream and the second hot reduced iron stream.

8. The method of claim 1, wherein the hot briquetting plant comprises one or more hot briquetting machines each comprising a feeder.

9. The method of claim 1, further comprising sending at least a portion of the first hot direct reduced iron stream to a bypass discharge leg.

10. The method of claim 1, wherein the melting furnace comprises, prior to the melting furnace, one or more of a first feeder, a surge bin, and a second feeder.

11. The method of claim 1, further comprising providing a third hot direct reduced iron stream that is sent continuously to one or more hot transport vessels.

12. The method of claim 1, wherein the insulated duct acts as a dynamic sealing leg and internally contains an injected flow of sealing gas that comprises an upwards flowing component that prevents the escape of gas from the furnace and a downwards flowing component that causes a pressure drop through the hot direct reduced iron stream.

13. A method for the supply of a continuous stream of hot direct reduced iron from a direct reduction shaft furnace or direct reduced iron reheating furnace to a point outside of the direct reduction shaft furnace or direct reduced iron reheating furnace, the method comprising:
   depressurizing a hot direct reduced iron stream in an insulated duct;
   after the depressurizing step, splitting the depressurized hot direct reduced iron stream into at least two depressurized hot direct reduced iron streams;
   after the splitting step, providing a first depressurized hot direct reduced iron stream that is sent continuously to a hot briquetting plant by gravity in a first closed duct system;
   after the splitting step, providing a second depressurized hot direct reduced iron stream that is sent continuously to an adjacent melting furnace one of:
      by gravity in a second closed duct system, and
      by a combination of gravity in the second closed duct system and a generally horizontal charge conveyor; and
   after the splitting step, providing a third depressurized hot direct reduced iron stream that is sent continuously to one or more hot transport vessels.

14. The method of claim 13, wherein the insulated duct acts as a dynamic sealing leg and internally contains an injected flow of sealing gas that comprises an upwards flowing component that prevents the escape of gas from the furnace and a downwards flowing component that causes a pressure drop through the hot direct reduced iron stream.

* * * * *